United States Patent [19]

König et al.

[11] Patent Number: 4,739,327
[45] Date of Patent: Apr. 19, 1988

[54] METHOD AND ARRANGEMENT FOR THE SUPPRESSION OF RAIN ECHOS IN A TERRAIN FOLLOWING RADAR

[75] Inventors: Martin König, Günzburg; David Robinson; Rudolf Lesiow, both of Ulm; Erwin Wölfle, Ehingen, all of Fed. Rep. of Germany

[73] Assignee: Licentia Patent-Verwaltungs-GmbH, Fed. Rep. of Germany

[21] Appl. No.: 843,071

[22] Filed: Mar. 24, 1986

[30] Foreign Application Priority Data

Mar. 23, 1985 [DE] Fed. Rep. of Germany ....... 3510576

[51] Int. Cl.$^4$ ................. G01S 13/94; G01S 13/44; G01S 13/95
[52] U.S. Cl. .......................... 342/26; 342/91; 342/149; 342/159
[58] Field of Search .................. 342/91–94, 342/149–154, 159–162, 26

[56] References Cited

U.S. PATENT DOCUMENTS

| | | | |
|---|---|---|---|
| 4,143,371 | 3/1979 | Salvaudon et al. | 342/94 |
| 4,231,037 | 10/1980 | Long | 342/149 |
| 4,296,415 | 10/1981 | Pelton et al. | 342/94 |

OTHER PUBLICATIONS

M. Skolnik, *Intro. to Radar Systems,* (McGraw-Hill, 1980), pp. 486–488.

*Primary Examiner*—Theodore M. Blum
*Assistant Examiner*—Bernarr Earl Gregory
*Attorney, Agent, or Firm*—McGlew and Tuttle

[57] ABSTRACT

To suppress rain echos in a terrain tracking radar with elevation monopulse devices, the signal in the difference channel is amplified by a predetermined factor. By comparing the level of the sum signal with the amplified difference signal, conclusion is reached about the presence of a ground echo or a rain echo. The factor should preferably be automatically adjustable according to the level in the sum channel.

14 Claims, 2 Drawing Sheets

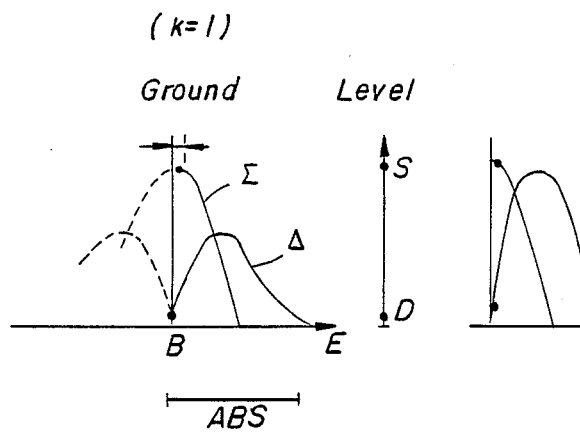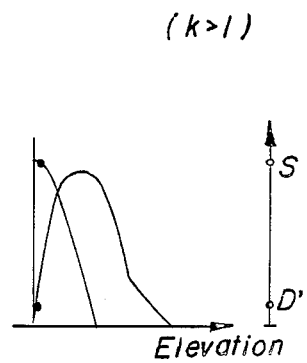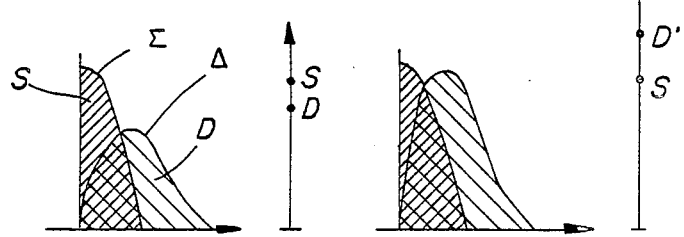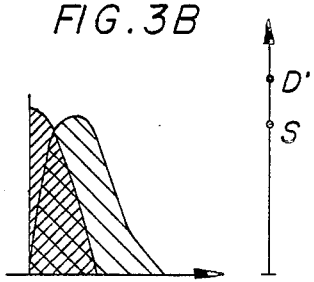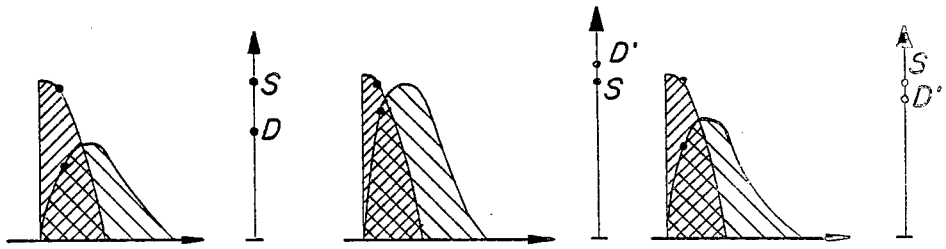

METHOD AND ARRANGEMENT FOR THE SUPPRESSION OF RAIN ECHOS IN A TERRAIN FOLLOWING RADAR

FIELD AND BACKGROUND OF THE INVENTION

The present invention relates to a method for the suppression of rain echos with a terrain following radar of the kind which has an elevation monopulse device and an arrangement for carrying out such a process.

The elimination of side lobe echos by means of a guard channel and the restriction to directions above the antenna axis direction (boresight) by phase comparison of sum and difference signals of an elevation monopulse radar are part of the general state of the art. The prerequisite for recognition as ground in a terrain tracking radar is that an amplitude threshold must be exceeded in the sum channel. In the processor, the usual monopulse processing is replaced by the so-called MRI-algorithm. This algorithm has the effect that echos are only over a small region directly above boresight.

Rain echos (caused by droplets of water) can also frequently exceed the amplitude threshold and be mistaken for a ground echo, so that the terrain following control triggers a wrong maneuver to avoid the supposed ground, and the aircraft climbs above the cloud cover.

Prior art processes for eliminating rain echos are based on the use of circular polarized waves. The selective reception of echos of only one polarization direction can only be used in light rain situations.

A further developed, already proposed process goes on from there to provide for separate reception of both polarizations and the recognition of rain clutter by means of an amplitude comparison.

The disadvantage of this is that it necessitates an additional receiving channel.

SUMMARY OF THE INVENTION

The present invention seeks to solve the problem of developing a process of the kind specified at the beginning, that makes it possible at little additional cost to largely eliminate rain echo. The invention also provides an arrangement for carrying out such a process.

Accordingly an object of the present invention is to provide a process and arrangement for eliminating rain echo in a terrain following radar having an elevation monopulse device with a sum channel and a difference channel each having a signal amplitude, where all echos above an antenna boresight are taken into account and are integrated over a narrow range area, and wherein the signal amplitude of the difference channel is reinforced by a predetermined factor and compared with the signal amplitude of the sum channel. Echo is eliminated if the reinforced signal amplitude is greater the difference channel than in the sum channel.

The invention is notable for the very small additional outlay required on conventional terrain following radar, since it is only necessary to amplify the signal by multiplication or, in in a preferred embodiment with logarithmized signals, by the addition of a predetermined level.

A further object of the invention is to provide an arangement for carrying out the process of the invention which is simple in design, rugged in construction and economical to manufacture.

BRIEF DESCRIPTION OF THE DRAWINGS

Embodiments of the invention are illustrated in the drawings, wherein:

FIG. 2A is a graph showing the level or amplitude of the sum and difference channels of an elevation monopulse device in a terrain following radar, relating the amplitudes to elevation above boresight over terrain when it is not raining;

FIG. 2B is a graph similar to FIG. 2A showing the inventive signal processing;

FIG. 3A is a view similar to FIG. 2A showing signals when it is raining;

FIG. 3B is a view similar to FIG. 2B showing signals when it is raining and processed in accordance with the invention;

FIG. 4A is a graph similar to FIG. 3A in the presence of rain and weakly reflecting ground;

FIG. 4B is a graph similar to FIG. 3B showing signal processing according to the present invention in the presence of rain and weakly reflecting ground;

FIG. 4C is a view similar to FIG. 4B showing how the amplification factor can be changed in accordance with the present invention to compensate for weakly reflecting ground;

DESCRIPTION OF THE PREFERRED EMBODIMENTS

Figure 1:
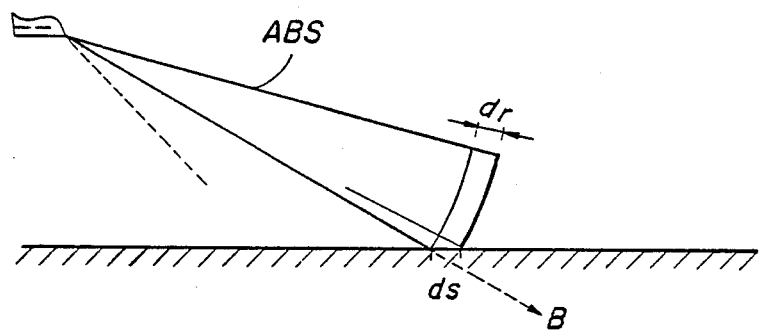
FIG. 1 is a schematic illustrational view showing a flight simulation with a terrain following radar of an aircraft moving over the ground.

In FIG. 1 of the ground area which is detected by the portion of the antenna pattern ABS lying over a boresight (B), only ground location due to restriction to a narrow range ring dr and to the echo closest to the antenna, which for the ground echo entails a considerable narrowing of the antenna angle over boresight. Ground echos are therefore usually picked up only from the sum curve $\Sigma$ shown in FIG. 2A, and appear in the difference channel only with much smaller amplitude. The difference curve is shown at $\Delta$.

When it is not raining (FIGS. 2A and 2B), there will thus be considerably higher amplitude S in the sum channel than in the difference channel D in FIG. 2A or D' in FIG. 2B, both when k=1 (FIG. 2A), i.e. without the additional amplification called for by the invention, and when the invention is used (FIG. 2B), i.e. k>1. The invention is thus capable of providing equally reliable ground recognition in non-interference environment of this kind.

FIGS. 3A and 3B represent the level situation with rain and without ground echos. The signal amplitudes in the channel correspond to the integration over the entire beam range of the sum ($\Sigma$) or difference ($\Delta$) curve, since the rain area represents a planar target that extends over the entire angle range of the diagrams. The amplitude S in the sum channel exceeds the amplitude threshold and without the invention is greater than the amplitude D in the difference channel (FIG. 3A). An amplitude comparison in this case results in target detection, which triggers a wrong maneuver in the terrain following control.

With an additional amplification pursuant to the invention by a factor k, the reinforced amplitude D' of the difference channel is greater than the amplitude S in the sum channel, so that now an amplitude comparison of S and D' leads to elimination of this echo as the result of a conclusion about the presence of rain clutter. The result is thus a reliable elimination of pure rain echo.

When there are ground echos and rain echos at the same time, one must distinguish between strongly to averagely reflecting ground and weakly reflecting ground. With strongly to averagely reflecting ground, the rain, because of its small back scatter cross-section, delivers only a relatively small signal proportion, and the level situation is largely the same as that shown in FIGS. 2A and 2B.

In the case of rain and weakly reflecting ground, the level of ground echo, for one thing, is still only roughly on the same order as the level of rain clutter; for another, with very weakly reflecting ground, the ground echo closest to the antenna is not always recognized and a ground echo lying further above boresight is picked up, under which conditions the proportion of ground echo even in the difference channel can no longer be relied on. In this case, with the additional reiforcement, amplitude D' in the difference channel can be greater in spite of the presence of a ground echo than in the sum channel (FIGS. 4A, 4B).

This can generally be tolerated, however, because such slight reflecting power on the part of the ground occurs and because the ground recognition in one of the adjacent elevation positions of the pivoted diagram is sufficient for the functioning of the terrain following control. However, a further development of the invention provides that the amplification factor k can be variably assigned and is automatically adjusted according to the amplitude in the sum channel, where for large amplitudes corresponding to strong ground echos (see FIG. 2B) a greater amplification factor is used than for small amplitudes S corresponding to a possibly weak ground echo (FIG. 4C). The amplification factor k would then be, for example, in the range of from two (2) to five (5).

Figure 5:
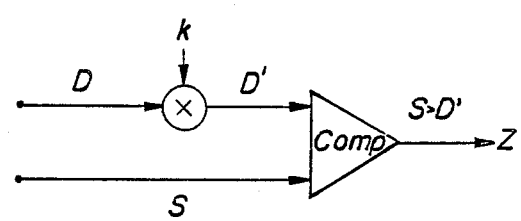
FIG. 5 is a schematic block diagram showing an arrangement for practicing the invention according to one embodiment thereof.

FIG. 5 shows a diagrammatic layout of an arrangement for carrying out the described process, in which the sum channel and the difference channel are connected to the two input points of a comparator for purposes of level comparison. Along the difference channel before it reaches the comparator, lies a multiplier that amplifies the difference signal D by a given factor k. The comparator gives out a signal Z indicating the presence of a ground echo when the sum signal S is greater than the amplified difference signal D'.

Figure 6:
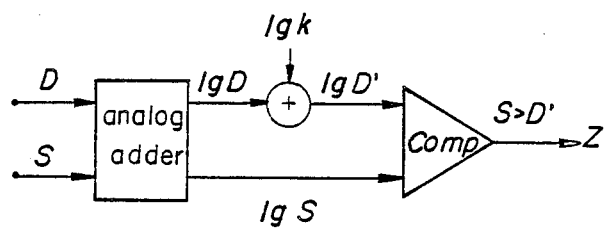
FIG. 6 is a view similar to FIG. 5 showing another embodiment of the invention.

The arrangement in FIG. 6 differs from that shown in FIG. 5 in that the sum and difference signals S and D are logarithmized. That is the logarithm of the signals S and D (lgS and lgD respectively) are taken and a level correspnding to lgk (logarithm of factor k) is simply added to it in an analog adder.

While specific embodiments of the invention have been shown and described in detail to illustrate the appliation of the principles of the invention, it will be understood that the invention may be embodied otherwise without departing from such principles.

What is claimed is:

1. A process for eliminating rain echo in the signals of a terrain tracking radar with elevation monopulse means for sending and receiving signals over an antenna pattern lying above a boresight direction, the monopulse means having a sum channel for summing signals and a difference channel for differencing signals, each channel having a signal amplitude, and where only echoes above the antenna boresight are taken into account and are integrated over a narrow range area, comprising aiming the antenna boresight at the intersect on the ground, reinforcing the signal amplitude of the difference channel by a predetermined factor which is greater than one as compared to any reinforcement of the sum channel, to form a reinforced signal amplitude, comparing the reinforced signal amplitude to the signal amplitude of the sum channel, and eliminating the echo signal if the reinforced signal amplitude is greater than the sum channel signal amplitude.

2. A process according to claim 1, including multiplying the signal amplitude of the difference channel by the predetermined factor to form the reinforced signal amplitude.

3. A process according to claim 2, including changing the predetermined factor in accordance with the amplitude of the sum channel to compensate for changing conditions of rain and terrain.

4. A process according to claim 1, including taking the logarithm of the signal amplitudes for at least one of the difference channel and the sum channel, taking the logarithm of the predetermined factor, and adding the logarithm of the predetermined factor to the logarithm of the signal amplitude of the difference channel to form the reinforced signal amplitude.

5. A process according to claim 4, including changing the predetermined factor in accordance with the amplitude of the sum channel to compensate for changing conditions of rain and terrain.

6. A process according to claim 1, including changing the predetermined factor in accordance with the amplitude of the sum channel to compensate for changing conditions of rain and terrain.

7. A process for eliminating rain echo in terrain tracking radar with an elevation monopulse device having a sum channel and a difference channel each having a signal amplitude, where only echoes above an antenna boresight are taken into account and are integrated over a narrow range area, characterized in that the antenna boresight is aimed to intersect the ground, the signal amplitude (D) of the difference channel is reinforced by a predetermined factor (k) and to a greater extent than the sum channel to form a reinforced signal amplitude (D') and the reinforced signal amplitude is compared with the signal amplitude (S) of the sum channel, and that the echo is eliminated if the reinforced signal amplitude (D') is greater in the difference channel than in the sum channel.

8. A process pursuant to claim 7, chracterized in that the signal amplitude in both channels are logarithmized and the signal amplitude (lgD) in the difference channel is increased by a predetermined amount (lgk).

9. A process pursuant to claim 7, characterized in that the factor (k) is variably predetermined and adjusted depending on the amplitude of the sum channel automatically.

10. An arrangement for eliminating rain echo in a terrain tracking radar having elevation monopulse means with a sum channel and a difference channel both having signal amplitudes and wherein the monopulse means only takes account of echoes above an antenna boresight directed to the ground, which echoes are integrated over a narrow range area of the terrain, the arrangement comprising means for reinforcing the signal amplitude of the difference channel by a predetermined factor which is above one and which is greater than any reinforcement of the sum channel, to form a reinforced signal amplitude, and comparator means for comparing the reinforced signal amplitude to the signal amplitude of the sum channel to form an output, the echo being eliminated if the output indicates that the reinforced signal amplitude is greater than the signal amplitude of the sum channel.

11. An arrangement according to claim 10, wherein the factor is selected to be from 2 to 5.

12. An arrangement according to claim 10, wherein said reinforcing means comprises a multiplier for multiplying said predetermined factor by the signal amplitude of the difference channel.

13. An arrangement according to claim 10, wherein said reinforcement means comprises logarithm means for taking the logarithm of the predetermined factor and the signal amplitudes of the difference channel and the sum channel, and means for adding the logarithm of the predetermined factor to the logarithm of the signal amplitude of the difference channel for forming a logarithm of the reinforced signal amplitude, said comparator receiving the logarithm of the signal amplitude of the sum channel.

14. An arrangement according to claim 13, wherein the predetermined factor before the logarithm is taken is from 2 to 5.

* * * * *